(12) United States Patent
Jagt et al.

(10) Patent No.: US 7,265,800 B2
(45) Date of Patent: Sep. 4, 2007

(54) MICRO-STRUCTURED ILLUMINATION SYSTEM FOR PROVIDING POLARIZED LIGHT

(75) Inventors: Hendrik Johannes Boudewijn Jagt, Eindhoven (NL); Cees Bastiaansen, Montfort (NL); Hugo Johan Cornelissen, Eindhoven (NL); Dirk Jan Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/252,931

(22) Filed: Sep. 23, 2002

(65) Prior Publication Data

US 2003/0058383 A1    Mar. 27, 2003

(30) Foreign Application Priority Data

Sep. 26, 2001 (EP) .................................. 01203674

(51) Int. Cl.
*G02F 1/1335* (2006.01)
(52) U.S. Cl. ............................ 349/61; 349/63; 349/65
(58) Field of Classification Search ............ 349/61–65; 359/483–500; 385/11–15, 36–37, 129–131
See application file for complete search history.

(56) References Cited

U.S. PATENT DOCUMENTS 5,729,311 A * 3/1998 Broer et al. .................. 349/65
2003/0058386 A1* 3/2003 Bastiaansen et al. ........ 349/100

* cited by examiner

*Primary Examiner*—Dung T. Nguyen

(57) ABSTRACT

A multi-layered arrangement according to the invention provide emission of polarized light. At least one of the interfacing surfaces between the layers is provided with a microstructure. In one embodiment, a first layer in the form of a lightguide substrate (401) receives unpolarized light from a lamp (420). A birefringent second layer (402) is provided with a microstructure (410) in the form of parallel grooves. On top of the birefringent layer a third layer (403), i.e. a coating layer, is located. Light is outcoupled by way of selective Total Internal Reflection, TIR, at the micro-structured surface of the birefringent layer, yielding a highly linearly polarized emission at near normal angles. The polarized light may be emitted out through the coating or in an opposite direction through the lightguide, which in an advantageous manner allow any configuration of transmissive (backlight), transflective (backlight) or reflective (frontlight) display arrangement.

20 Claims, 7 Drawing Sheets

 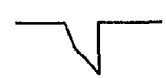  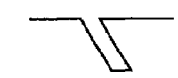 
FIG. 6a   FIG. 6b   FIG. 6c   FIG. 6d   FIG. 6e
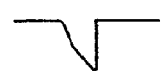   
FIG. 6f   FIG. 6g   FIG. 6h   FIG. 6i
    
FIG. 6j   FIG. 6k   FIG. 6l   FIG. 6m   FIG. 6n
   
FIG. 6o   FIG. 6p   FIG. 6q   FIG. 6r

MICRO-STRUCTURED ILLUMINATION SYSTEM FOR PROVIDING POLARIZED LIGHT

FIELD OF THE INVENTION

The present invention relates to an illumination arrangement, and a system including such, arranged to receive unpolarized light and emit polarized light, comprising at least a first layer in the form of a optically clear lightguide, a birefringent second layer and a third layer.

BACKGROUND

Flat panel displays, such as liquid crystal displays (LCD), are necessary components of many kinds of electronic equipment, not least portable computers, mobile communication terminals etc. Such devices are by necessity powered by batteries and hence it is of vital importance that the energy in the batteries is used in a most effective manner.

To achieve high total energy efficiency in illumination systems for back lit or front lit LCD's, losses associated with the generation of polarized light should be minimized. A recent approach is to recycle light of undesired polarization instead of absorbing it. This can be done using the reflective polarizing foils that have recently become available from different manufacturers. Such foils directly transmit one polarization direction of light and reflect the undesired polarization back into the illumination system where it is recycled. Also polarizing foils have been proposed in which the undesired polarization direction of light is back scattered instead off reflected and subsequently recycled.

An alternative approach is to design a back light or a front light system that directly emits one polarization state of light. In a back light system, reflective or scattering polarization foils such as those described above are incorporated.

Another concept for polarization separation has also been used, such as polarization-dependent total internal reflection (TIR), oriented liquid crystalline coatings or combinations thereof. An example of the latter concept is presented in U.S. Pat. No. 5,729,311 in which is shown an illumination system for a flat panel picture display device.

The illumination system of U.S. Pat. No. 5,729,311 includes an optical waveguide into which light is coupled via an end face of the waveguide. The waveguide is provided with recesses that are filled with a material that is different from that of the waveguide. One of the materials is optically isotropic having an index of refraction $n_p$ and the other material is optically anisotropic having indices of refraction $n_o$ and $n_e$. For the refractive indices it should hold that $n_o$ or $n_e$ is equal or substantially equal to $n_p$ in order that there is separation of polarization at the interface between isotropic and anisotropic material, resulting in a polarised emission.

A drawback of the device shown in U.S. Pat. No. 5,729,311 is that the recesses are located in the optical waveguide itself. This makes the waveguide more or less complicated, and hence relatively expensive, to manufacture.

SUMMARY OF THE INVENTION

An object of the present invention is to overcome the problems associated with the drawbacks of the state of the art. That is, how to obtain energy efficient illumination systems for a flat panel display, while at the same time keeping the manufacturing process at a simple and non-expensive level.

This is obtained by providing an illumination arrangement that receives unpolarized light and emits polarized light. The arrangement comprises at least a first layer in the form of an optically clear lightguide, a birefringent second layer and a third layer. At least one interfacing surface between any two of the layers comprises a microstructure. Preferably, to avoid having to microstructure the lightguide, the interfacing surface between the second and third layer comprises a microstructure.

In a preferred embodiment, the birefringent layer is located between the lightguide and the third layer, whereby the third layer acts as a coating layer. In another preferred embodiment, the third layer is located between the lightguide and the birefringent layer, whereby the third layer acts as an adhesive layer. Furthermore, in an alternative embodiment the first layer and the third layer refer to one and the same layer.

Moreover, by an appropriate selection of material in the lightguide, birefringent layer and the coating or adhesive layer, thereby selecting the refractive indices, as well as appropriately providing the birefringent layer with a micro-structured surface, the arrangement will emit polarized light.

Although it is preferred that the index of refraction of the third layer matches one of the indices of refraction in the birefringent layer in order to minimize refraction/reflection losses of the corresponding polarization direction, it is not essentially necessary for a proper function of the most preferable outcoupling mechanism: selective TIR at the micro-structure of the desired polarization direction. Some mismatch in refractive index is tolerated for the undesired polarization direction without TIR to occur at the micro-structure. Hence, a substantial match within +/−0.04, preferentially within +/−0.02, and more preferentially within +/−0.01 is acceptable. Moreover, the birefringent layer serves to increase the difference in refractive index for the desired polarization direction, while still substantially matching the orthogonal polarization, which results in an improvement of the amount of emission and polarized contrast. In order for this selective T.I.R. of waveguided light to occur at the micro-structure, it is necessary to achieve a significant mismatch in refractive index between the birefringent layer and the coating layer for the corresponding polarization direction, i.e. in the corresponding spatial direction, the refractive index of the birefringent layer should be significantly higher than the refractive index of the coating layer.

This yields a critical angle for T.I.R. at the birefringent layer—coating interface, i.e. light incident at the interface at angles larger than the critical angle are totally internally reflected. By combining a sufficiently large critical angle with a sufficient tilt angle of the interface, i.e. top angle of the micro-structure, the angular region which is totally internally reflected can be controlled to be within the waveguided angular range and the corresponding angular direction after total internal reflection to be resulting in an emission from the lightguide. With a proper optimization, a waveguided angular region can be selected to be totally internally reflected at the micro-structure interface and directed towards angles resulting in a polarized emission close to the normal direction of the lightguide.

In another embodiment, unpolarized light enters an end face of the lightguide. A component of polarization of the light is subject to TIR at interfaces between the lightguide and the birefringent layer as well as at the interface between the coating and the surrounding air. Another component of polarization of the light is refracted or reflected at the micro-structured interface between the birefringent film and the coating and is emitted out of the arrangement towards a display or a viewer. In this embodiment of the invention, the microstructure of the birefringent layer is in the form of parallel ridges that extend out of the surface and cause refraction of a polarization component of the light thereby predominantly coupling out light through the coating layer towards a LCD. In another embodiment of the invention, the microstructure of the birefringent layer is in the form of parallel grooves that extend into the surface and cause TIR and/or reflection of a polarization component of the light thereby predominantly coupling out light through the lightguide towards a LCD. Polarized light is also coupled out, in an embodiment where the third layer is located between the lightguide and the birefringent layer, by TIR/reflection at the microstructure predominantly through the birefringent layer towards the LCD.

The arrangements according to the invention are capable of very efficient provision of polarized emission. The light outcoupling mechanism by selective Total Internal Reflection (TIR) at the micro-structure yields a highly linearly polarized emission at near normal angles, which is impossible to achieve with a refractive process in arrangements according to prior art, e.g. U.S. Pat. No. 5,729,311.

The polarized light may hence be emitted out through the coating or in an opposite direction through the guide, which in an advantageous manner allow any configuration of transmissive (backlight), transflective (backlight) or reflective (frontlight) display arrangement.

A further advantage provided by the invention is that, when the microstructure is applied on a birefringent layer, e.g. by way of applying to a LC-based film known UV replication or UV curing processes, the manufacturing process can be simplified and hence becoming cheaper as compared to prior art arrangements.

These and other aspects of the invention will be apparent from and elucidated with reference to the embodiments described hereinafter

BRIEF DESCRIPTION OF THE DRAWINGS

FIGS. 6a-6r show schematically cross-sectional views of microstructures.

PREFERRED EMBODIMENTS

Figure 1:
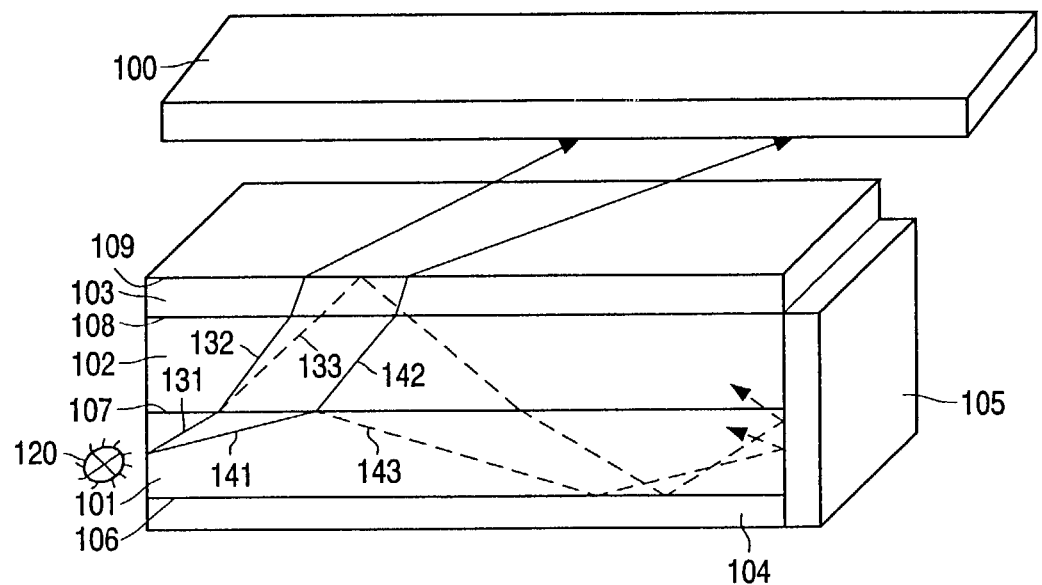
FIG. 1 shows schematically a perspective view of an illumination device according to the invention.
Figure 2A:
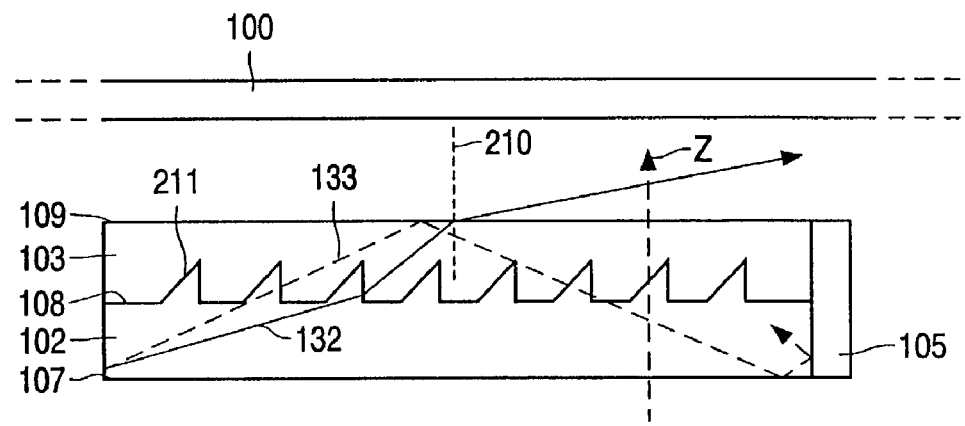
FIGS. 2a and 2b show schematically cross-sectional views of interfaces between layers in an illumination device according to the invention.
Figure 2B:
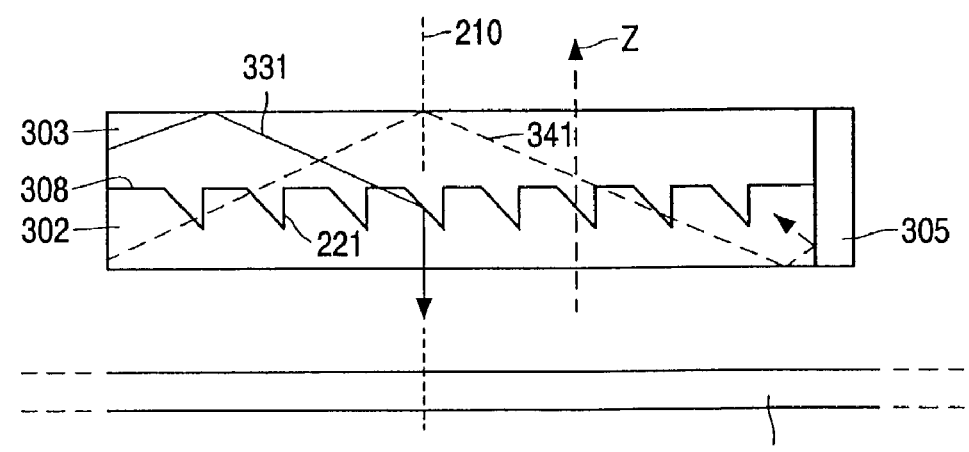

Referring to FIGS. 1, 2a and 2b, it is shown a back light system for a LCD 100 comprising an isotropic optical waveguide 101, a birefringent layer 102 with a microstructure 211,221 and a top-coating 103. A first reflector 104 and a second reflector 105 are arranged adjacent to the lightguide for the purpose of recycling the preferentially trapped polarization direction within the lightguide. This might be accomplished by way of providing the reflectors 104,105 in the form of depolarized reflectors, e.g. a diffuse reflector, a combination of a specular mirror and a quarter-wave film.

Alternatively, optical retardation of the polarized waveguided light in an additional retarding layer provides an alternative means of light recycling. Also, recycling through optical retardation can result from deviations from ideal optical isotropy of the optical waveguide 101, as commonly occurs in, for instance, an injection moulded PolyCarbonate (PC) layer.

The material used as optical waveguide 101 typically consists, for instance, of transparent polymers, such as PolyMethylMethacrylate (PMMA), PolyCarbonate (PC) or PolyStyrene (PS). The birefringent layer 102 typically consists, for instance, of an oriented (e.g. stretched) polymeric layer, such as oriented PolyEthyleneTerephthalate (PET), PolyButyleneTerephthalate (PBT), PolyEthyleneNaphthalate (PEN) or of a Liquid Crystalline layer, such as a cured uniaxially oriented Liquid Crystalline layer or a cross-linked Liquid Crystal network. The coating layer 103 typically consists, for instance, of a transparent polymeric material, such as polymerized acrylics (e.g. cured Bisphenol A ethoxylated diacrylate, cured hexanedioldiacrylate (HDDA), cured phenoxyethylacrylate (POEA), cured epoxy resins, mixtures of such materials or of an oriented Liquid Crystalline layer.

Unpolarized light is emanating from a light source 120 and enters the waveguide along a plurality of light paths out of which a first light path 131 and a second light path 141 are shown. The propagation of the light paths 131,141 will be discussed in some detail below.

However, before commencing with the detailed description of the propagation of the light paths, it is opportune to recall some properties of the phenomenon of polarization, which will be relied upon in the description of the embodiments to follow. Due to linear polarization, an unpolarized beam falls apart in two mutually perpendicularly polarized beam components. Such a polarization separation may be obtained, for example, by causing an unpolarized beam to be incident on an interface between an area with an isotropic material having refractive index $n_{iso}$ and an area with an anisotropic material having refractive indices $n_o$ and $n_e$, in which one of the two indices $n_o$ or $n_e$ is equal or substantially equal to $n_{iso}$. When an unpolarized beam is incident on such an interface, the beam component which does not detect any difference in refractive index at the interface between isotropic and anisotropic material will be passed unrefracted, whereas the other component will be refracted. If $n_{iso}$ is equal or substantially equal to $n_o$, then the ordinary beam is passed unrefracted by an interface between isotropic and anisotropic material; if $n_{iso}$ is equal or substantially equal to $n_e$, then such an interface passes the extraordinary beam unrefracted.

In this embodiment, the polymeric materials in the waveguide 101, birefringent film 102 and the coating 103 are chosen such that:

$$n_{o,film} < n_{iso,waveguide} < n_{e,film}$$

and $$n_{o,film} \approx n_{iso,coating}$$

where $n_{o,film}$ and $n_{e,film}$ is the ordinary refractive index and the extraordinary refractive index respectively of the birefringent film 102, $n_{iso,waveguide}$ is the isotropic refractive index of the waveguide 101 and $n_{iso,coating}$ is the isotropic refractive index of the coating 103.

Light of the s-polarization state experiences a transition from a low to a high refractive index at the waveguide/birefringent film interface 107 and consequently is coupled into the birefringent film 102, as indicated by light path 132 and light path 142. Light of the p-polarization experiences a transition from a high to a low refractive index and, consequently, is totally internally reflected in the waveguide if the light is collimated sufficiently, as illustrated by light path 133 and light path 143. In other words, a first polarization separation mechanism is introduced based on TIR at the waveguide/birefringent film interface 107.

The birefringent film is equipped with a microstructure (reference 211 in FIG. 2a, and reference 221 in FIG. 2b) to couple-out the s-polarized light 132,142 towards the LCD 100. Without such a microstructure the light remains trapped in the waveguide due to TIR at, for instance, the coating/air interface 109. The microstructure 211,221 is filled with a coating 103 which matches the ordinary refractive index of the birefringent film 102 and consequently a second polarization mechanism is introduced, i.e. residual P-polarized light, illustrated by light path 133, experiences a refractive index match between the birefringent film 102 and coating 103 and is totally internally reflected at the coating/air interface 109 and thus remains trapped. S-polarized light, i.e. light path 132, however, experiences a refractive index mismatch between the birefringent film 102 and coating 103 and, consequently, is coupled-out of the waveguide 101 by the microstructure 211,221 in the direction of the LCD 100 or viewer. To maximize the index mismatch for S-polarized light, the top coating 103 can be chosen anisotropic as well.

Optionally, in order to rotate the polarization direction of the emitted light into a different orientation, a polarization rotation layer can be added. For instance, to achieve a 45-degrees rotation of the polarization direction, a stack of two λ/4-retarders can be added, having their respective axes oriented 45-degrees relative to one another.

Some care should be taken regarding the design of the microstructure in the birefringent film 102. Two different microstructure designs 211,221 are illustrated in FIGS. 2a and 2b respectively, predominantly refraction and reflection. In FIG. 2a, a microstructure 211 is shown which predominantly couples-out the linearly polarized light via refraction. The main advantage of these microstructures is that depolarization of light during coupling-out is avoided and consequently highly polarized light can be obtained. However, the light is coupled-out at large angles with respect to the normal 210 to the waveguide plane and, consequently, additional re-direction foils (not shown) are required to obtain light emission in the direction of the LCD 100 or viewer.

Although the cross-section of the microstructures illustrated in FIGS. 2a and 2b is of triangular shape and also asymmetrical with respect to a direction Z, perpendicular to their extension into the plane of the figures, also triangularly shaped micro-structures which are symmetrical to the Z-direction can be applied. Furthermore, other modifications of the micro-structures may be applied, such as deviations from the triangular shape and/or deviations from the groove or ridge-like extension in the plane of the figures, such as hole or hump-like geometries. FIGS. 6a to 6r illustrate, by way of cross-section views, examples of geometries of a microstructure. The grooves or ridges may comprise a repetition of small grooves/ridges extending into the surface, or comprise pits or humps, and instead of being symmetrically or asymmetrically triangular also comprise concave, convex or a multitude of straight side faces.

In FIG. 2b, a microstructure 221 is shown which couples out light predominantly via Total Internal Reflection and the light is emitted directly towards the LCD 100 or viewer without using additional foils. A polarized light output centered along the normal 210 is achieved in combination with unidirectional outcoupling which is advantageous in frontlight applications. Also, the efficiency of the light outcoupling is extremely high in the case of reflective microstructures based on total internal reflection and this in contrast to refractive microstructures, which is characterized by a lower efficiency of the light outcoupling.

Figure 3:
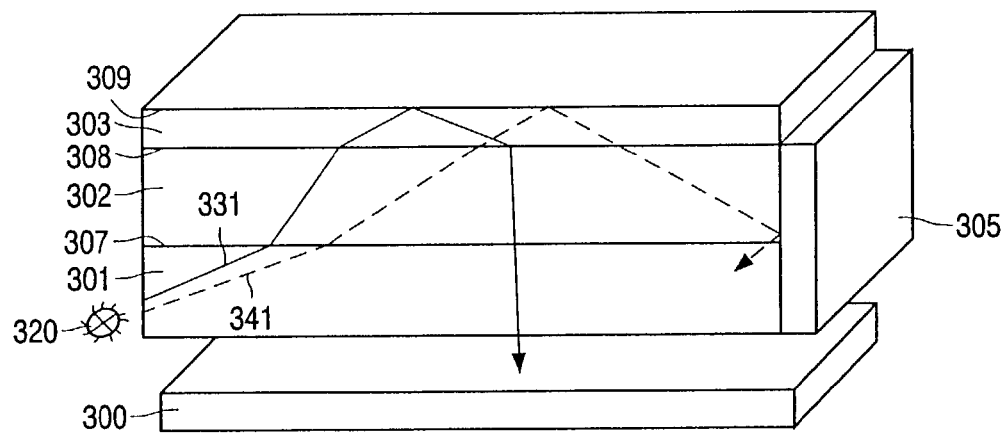
FIG. 3 shows schematically a perspective view of an illumination device according to the invention.

Turning now to FIG. 3 with additional reference to FIGS. 2a and 2b, a second design of a back light/front light illumination arrangement according to the invention is schematically shown. Similar to the system discussed in connection with FIGS. 1, 2a and 2b, it is shown a back light and/or front light system for a LCD 300 comprising an isotropic optical waveguide 301, a birefringent film 302 with a microstructure 211,221 and a top-coating 303. As in the previous example, a reflector 305 is arranged adjacent to the lightguide.

Unpolarized light is emanating from a light source 320 and enters the waveguide 301 along a plurality of light paths out of which the S-component of a first light path 331 and a P-component of a second light path 341 are shown. The polymeric materials are chosen such that:

$$n_{iso,waveguide} \leq n_{o,film} < n_{e,film}$$

and $$n_{o,film} = n_{iso,coating}$$

Here, both the S-polarized and P-polarized light experience a transition from a low to a high refractive index at the waveguide/birefringent film interface 307. In other words, both polarization directions of light are coupled into the birefringent film 302 and no separation of the polarization directions of light occurs at this specific interface 307, i.e. beams of both polarization directions are refracted differently, however neither polarization is excluded from the anisotropic layer. The separation of P- and S-polarized light and the coupling-out of light occur solely at the microstructure/top-coating interface 308. Advantages of this specific design are that the choice of materials is less critical and, more importantly, that the performance of the back light and/or front light becomes insensitive to whether or not light is properly collimated. That means that non-collimated light from a classical Cold Cathode Fluorescent Lamp (CCFL) or a Light Emitting Diode (LED) can, for instance, be used.

Figure 4A:
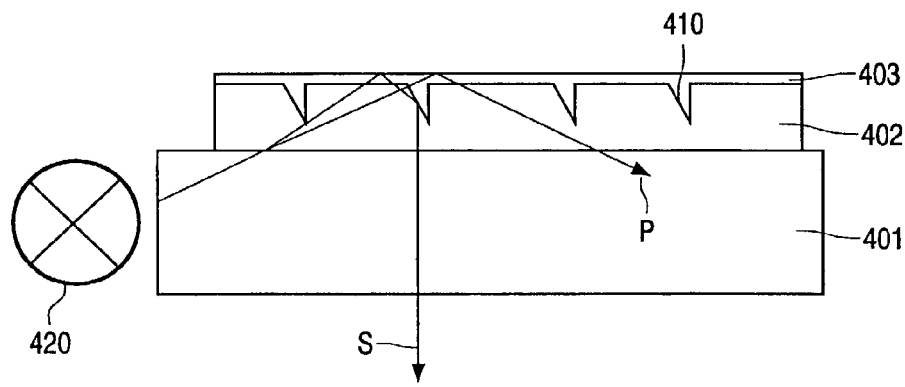
FIGS. 4a-4g show schematically cross-sectional views of illumination devices according to the invention.
Figure 4B:
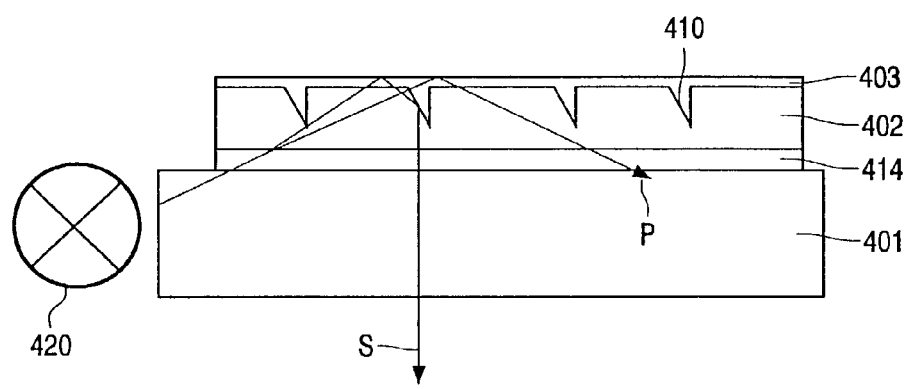
Figure 4C:
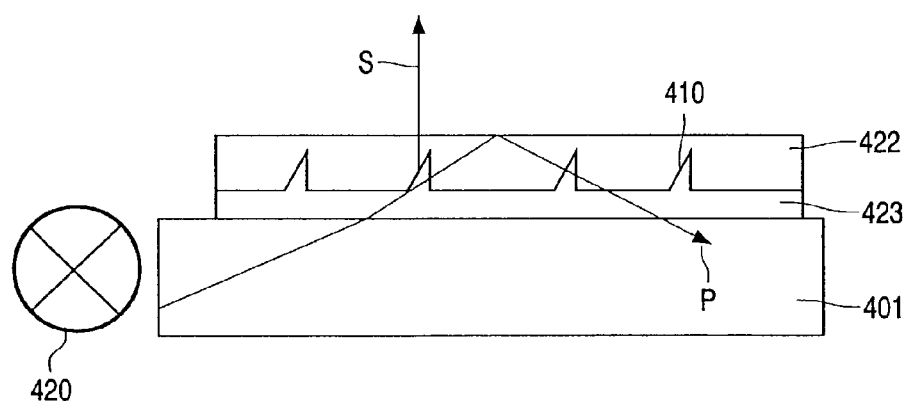
Figure 4D:
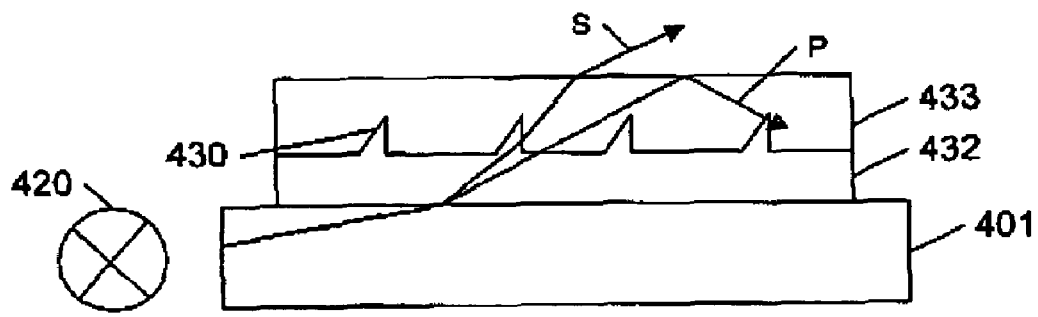
Figure 4E:
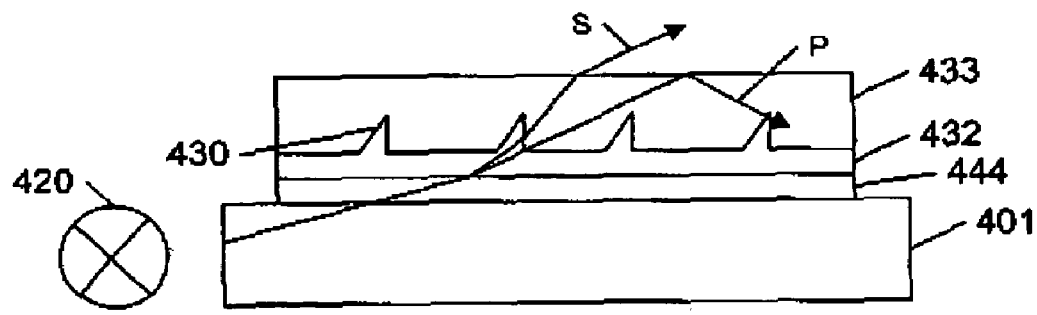
Figure 4F:
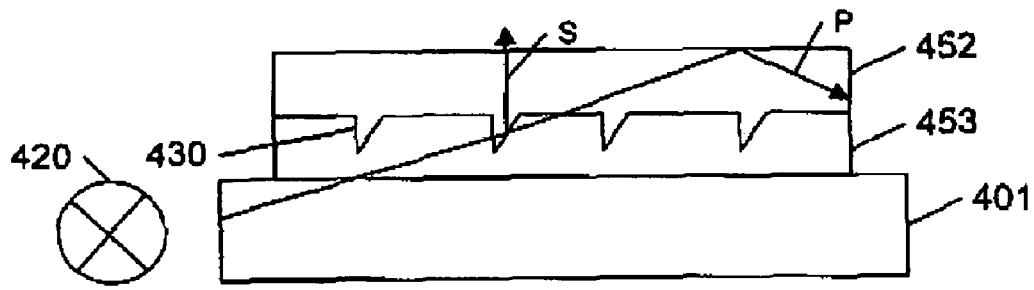

FIGS. 4a-4f show further variations on embodiments of an multi-layered illumination arrangement according to the present invention. A first layer in the form of a lightguide substrate 401 receives unpolarized light from a lamp 420. The propagation of the light and the separation into the S- and P-component is indicated in each of the FIGS. 4a-4f. Details regarding the propagation have already been presented above in connection with FIGS. 1-3. All examples in FIGS. 4a-4f include a birefringent layer which is provided with a microstructure 410,430. The microstructure 410 in the examples of FIGS. 4a-4c are parallel grooves whereas the microstructure 430 in the examples of FIGS. 4d-4f are in the form of parallel ridges.

In FIG. 4a, the lightguide substrate 401 is covered, at least partly, by a microstructured birefringent (i.e. anisotropic) second layer 402, on top of which a third layer 403, i.e. a coating layer, is located. The coating layer 403 may be either optically isotropic or anisotropic.

In FIG. 4b, similar to FIG. 4a, the lightguide substrate 401 is covered, at least partly, by a microstructured birefringent (i.e. anisotropic) second layer 402, on top of which a third coating layer 403 is located. However, in the arrangement in FIG. 4b, the birefringent layer 402 is arranged to the lightguide substrate layer 401 by way of an adhesive layer 414, e.g. glue.

In FIG. 4c, the lightguide substrate 401 is covered, at least partly, by a microstructured birefringent second layer 422. However, in contrast to the examples in FIGS. 4a and 4b, an adhesive third layer 423 is arranged between the substrate 401 and the second layer 422. The adhesive layer 423 may be either optically isotropic or anisotropic.

In FIG. 4d, the lightguide substrate 401 is covered, at least partly, by a microstructured birefringent second layer 432, on top of which a third layer 433, i.e. a coating layer, is located. The coating layer 433 may be either optically isotropic or anisotropic.

In FIG. 4e, similar to FIG. 4d, the lightguide substrate 401 is covered, at least partly, by a microstructured birefringent second layer 432, on top of which a third coating layer 433 is located. However, in the arrangement in FIG. 4b, the birefringent layer 432 is arranged to the lightguide substrate layer 401 by way of an adhesive layer 444, e.g. glue.

Figure 4G:
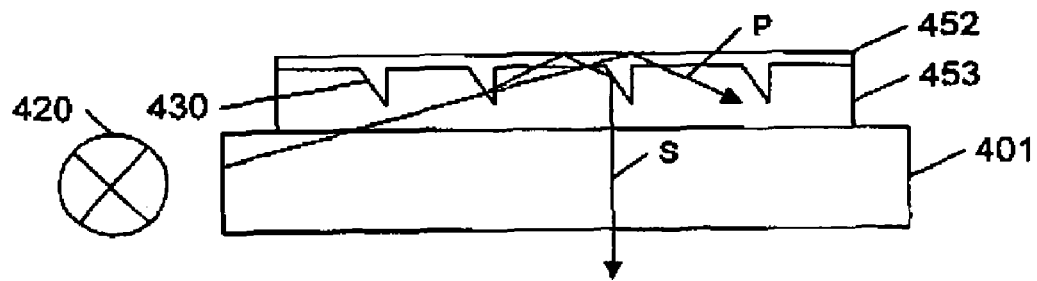

In FIGS. 4f and 4g, the lightguide substrate 401 is covered, at least partly, by a microstructured birefringent second layer 452. However in contrast to the examples in FIGS. 4d and 4e, an adhesive third layer 453 is arranged between the substrate 401 and the second layer 452. The adhesive layer 453 may be either optically isotropic or anisotropic.

Reference measurements of light emitted by arrangements where polarization separation occurs only at the substrate-oriented layer interface as well as measurements of light emitted by arrangements according to the invention have been made in order to illustrate the technical effect of the invention.

In a reference measurement, a polycarbonate waveguide with a refractive index $n_{iso,waveguide}$=1.585 was used. A stretched PEN film with a draw ratio of 4.5, $n_{o,film}$=1.57 and $n_{e,film}$=10.87 was used. A microstructure was micro-machined in the stretched film (c.f. FIG. 2b) with the long axis of the microstructure parallel to the drawing direction. The birefringent film was glued to the polycarbonate waveguide using glue with a refractive index of 1.585 (i.e. identical to the refractive index of the polycarbonate waveguide). Both non-collimated and highly collimated light was coupled into the waveguide and the polarization dependent angular distribution of emitted light was measured. The measurements show that light is mainly emitted at an angle of approximately 15 degrees with the normal to the plane of the waveguide. The contrast ratio between S- and P-polarized light is low in the case of non-collimated light (1.9 in the direction of the normal 210) and improves upon collimation of the incoming light (2.5 in the direction of the normal 210).

In a measurement using an arrangement according to the invention, a poly(methyl) methacrylate waveguide with a refractive index $n_{iso,waveguide}$=1.49 was used. A stretched PEN film with a draw ratio of 4.5, $n_{o,film}$=1.57 and $n_{e,film}$=1.87 was also used. A microstructure was micro-machined in the stretched film (c.f. FIG. 2b) with the long axis of the micro-structure parallel to the drawing direction. The birefringent film was glued to the poly(methyl)methacrylate waveguide using a glue with a refractive index of 1.49. A top-coating was added to the stretched film with a refractive index of 1.57 (i.e. identical to the ordinary refractive index of the stretched PEN film). Both non-collimated and highly collimated CCFL light was coupled into the waveguide and the polarization dependent spatial distribution of emitted light was measured. The measurements show that light is emitted predominantly along the normal to the plane of the waveguide on the lightguide side and that the contrast ratio between s- and p-polarized light is high for non-collimated incoming light.

In table 1 the total emitted light intensities are given when non-collimated edge-lighting is used, integrated over all angles and in table 2 the corresponding local intensity values at the normal direction are shown. It can be seen in table 2 that the ratio of S/P polarized light emitted along the surface normal can be as high as 60-90 and from the results presented in table 1 it can be seen that the integrated polarized contrast ratio of S/P light can be as high as 14.5.

Figure 5A:
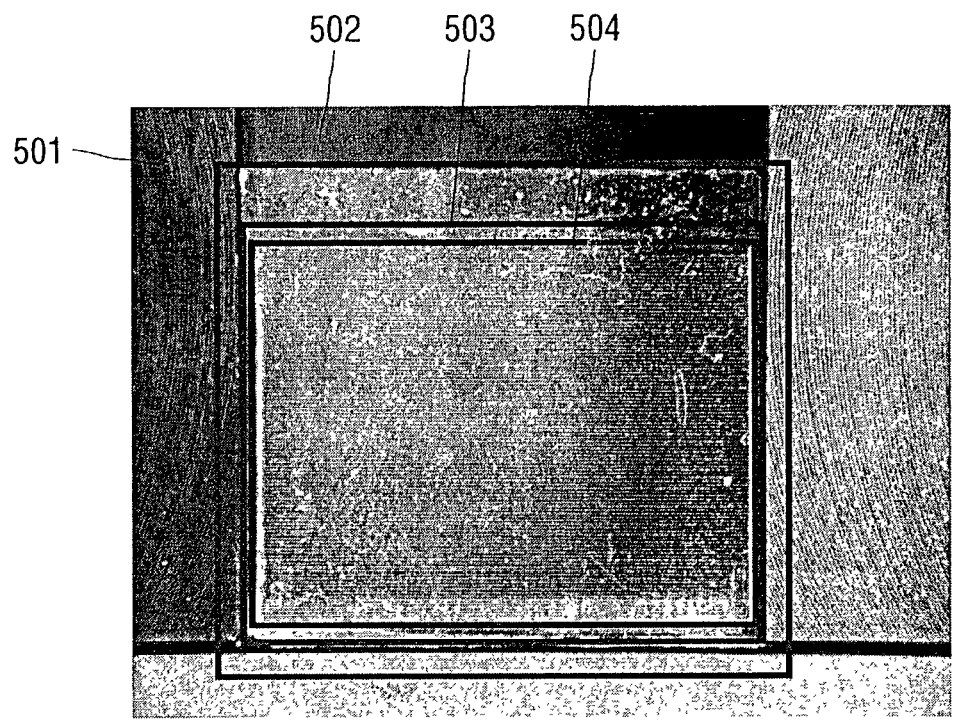
FIGS. 5a-5d show top views of an illumination device emitting light according to the invention.
Figure 5B:
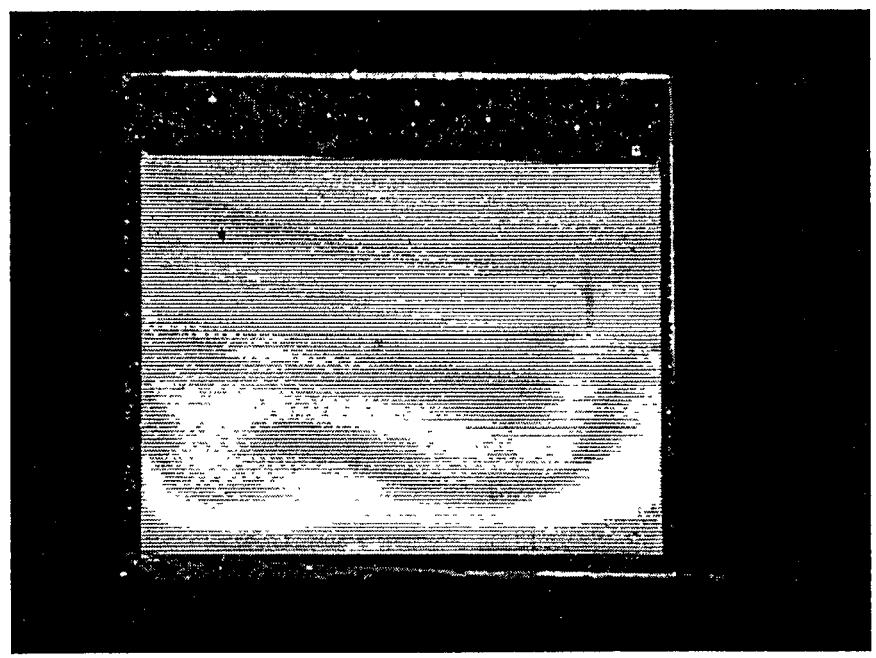
Figure 5C:
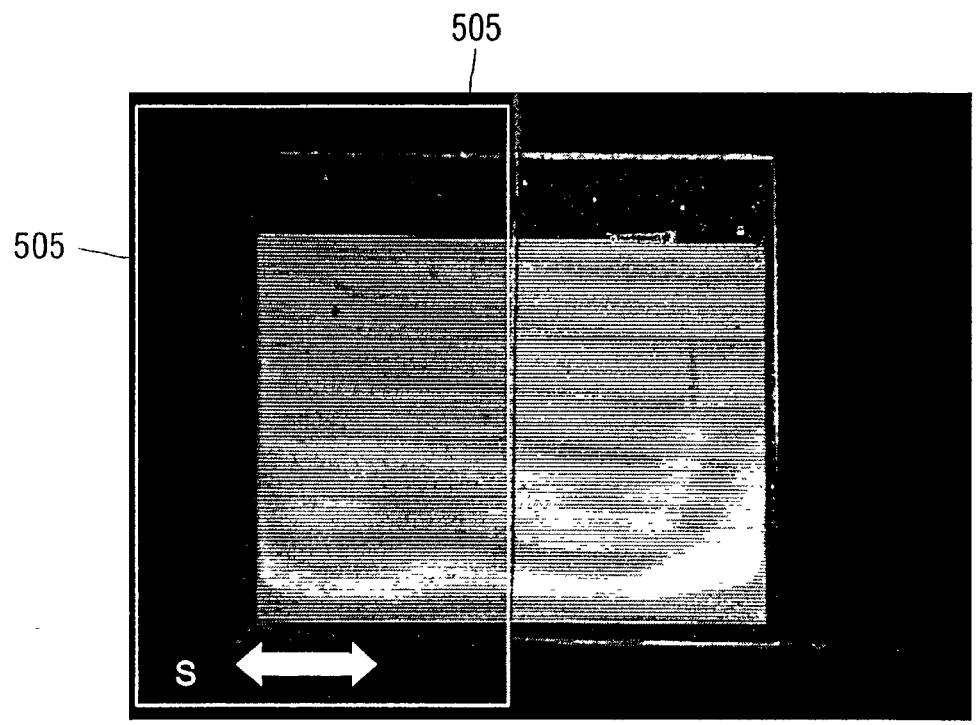
Figure 5D:
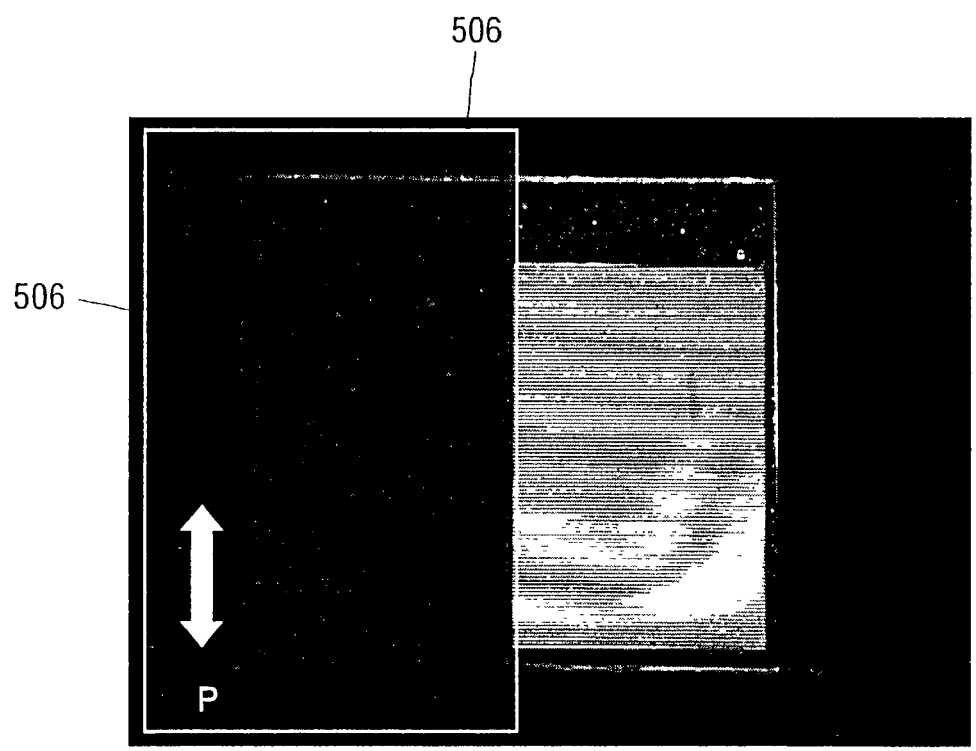

FIGS. 5a-d show photographs of a backlight prototype illumination arrangement such as one used in the example above. FIG. 5a shows a lamp and sample holder 501, a PMMA substrate 502 and a PEN foil 503 with a grooved area 504. FIG. 5b shows the arrangement with the lamp turned on and observed directly. Observing the left part of the backlight through a S-oriented polarizer 505, as is shown in FIG. 5c, hardly gives a reduction in brightness, whereas observing the left part of the backlight through a P-oriented polarizer 506, as is shown in FIG. 5d, turns the picture completely black, illustrating the high linearly polarised contrast of the lightguide emission.

TABLE 1

| | Integrated luminance ($lm/m^2$) | | S/P ratio |
|---|---|---|---|
| Substrate side | S | P | CR |
| Far from lamp | 265 | 25.1 | 9.0 |
| Center of sample | 297 | 36.0 | 8.25 |
| Close to lamp | 365 | 29.5 | 14.5 |
| | Integrated luminance | | S/P ratio |
| Coating side | S | P | CR |
| Center of sample | 153 | 45.0 | 3.4 |

TABLE 2

| | Normal luminance ($cd/m^2$) | | S/P ratio |
|---|---|---|---|
| Substrate side | S | P | CR |
| Far from lamp | 200 | 3 | 66.7 |
| Center of sample | 250 | 4 | 62.5 |
| Close to lamp | 260 | 3 | 86.7 |
| | Integrated luminance | | S/P ratio |
| Coating side | S | P | CR |
| Center of sample | 33 | 6 | 5.5 |

Hence, to summarize, a multi-layered arrangement according to the invention provide emission of polarized light. At least one of the interfacing surfaces between the layers is provided with a microstructure. In one embodiment, a first layer in the form of a lightguide substrate (401) receives unpolarized light from a lamp (420). A birefringent second layer (402) is provided with a microstructure (410) in the form of parallel grooves. On top of the birefringent layer a third layer (403), i.e. a coating layer, is located. Light is outcoupled by way of selective Total Internal Reflection, TIR, at the micro-structured surface of the birefringent layer, yielding a highly linearly polarized emission at near normal angles. The polarized light may be emitted out through the coating or in an opposite direction through the lightguide, which in an advantageous manner allow any configuration of transmissive (backlight), transflective (backlight) or reflective (frontlight) display arrangement.

The invention claimed is:

1. An arrangement comprising:
a lightguide that is configured to receive unpolarized light,
a birefringent layer that is optically coupled to the lightguide and configured to provide polarized light, and includes a substantially planar surface and an opposite facing interface surface, and
an interface layer that is located between the lightguide and the interface surface of the birefringent layer, wherein
the birefringent layer and the interface layer are coupled via a polarization-selective microstructure.

2. The arrangement of claim 1, wherein
the interface layer includes an adhesive.

3. The arrangement of claim 1, further including
a display panel that is configured to receive the polarized light.

4. The arrangement of claim 1, wherein
the birefringent layer includes the microstructure, and the interface layer fills grooves in the microstructure.

5. The arrangement of claim 4, wherein the birefringent layer includes an embossed PET.

6. The arrangement of claim 1, wherein
the microstructure is configured to facilitate emission of the polarized light at an angle that is substantially normal to a surface of the arrangement.

7. The arrangement of claim 1, wherein
the microstructure is configured to facilitate emission of the polarized light from the birefringent layer in a direction away from the lightguide.

8. The arrangement of claim 1, wherein
the microstructure is configured to facilitate emission of the polarized light from the birefringent layer in a direction toward the lightguide.

9. The arrangement of claim 1, wherein
the birefringent layer includes a first refraction index and a second refraction index, and
the interface layer has an index of refraction that substantially matches the first refraction index of the birefringent layer.

10. The arrangement of claim 9, wherein
the interface layer is isotropic.

11. The arrangement of claim 1, wherein
the birefringent layer includes a first refraction index and a second refraction index, and
the lightguide has an index of refraction that is less than the first and second indices of refraction of the birefringent layer.

12. The arrangement of claim 1, wherein
the birefringent layer includes a first refraction index and a second refraction index, and
the lightguide has an index of refraction that is between the first and second indices of refraction of the birefringent layer.

13. An arrangement comprising:
a lightguide that is configured to receive unpolarized light,
a birefringent layer that is optically coupled to the lightguide and configured to provide polarized light, and
an interface layer that is located between the lightguide and the interface surface of the birefringent layer, wherein
the birefringent layer and the interface layer are coupled via a polarization-selective microstructure, and the interface layer includes the microstructure, and the birefringent layer fills grooves in the microstructure.

14. The arrangement of claim 13, wherein
the birefringent layer includes a liquid crystal polymer.

15. An arrangement comprising:
a lightguide that is configured to receive unpolarized light,
a birefringent layer that is optically coupled to the lightguide and configured to provide polarized light, and
a third layer,
wherein
the birefringent layer is located between the lightguide and the third layer,
the birefringent layer and the third layer are coupled via a polarization-selective microstructure, and
the microstructure is configured to refract the polarized light so as to the polarized light is emitted through the lightguide.

16. The arrangement of claim 15, wherein
the microstructure is configured so that the polarized light is emitted at an angle that is substantially normal to a surface of the apparatus.

17. The arrangement of claim 15, further including
a display panel that is configured to receive the polarized light.

18. The arrangement of claim 15, wherein
the birefringent layer includes a first refraction index and a second refraction index, and
the third layer has an index of refraction that substantially matches the first refraction index of the birefringent layer.

19. The arrangement of claim 18, wherein
the third layer is anisotropic.

20. The arrangement of claim 15, wherein
the birefringent layer includes a first refraction index and a second refraction index, and
the lightguide has an index of refraction that is less than the first and second indices of refraction of the birefringent layer.

* * * * *